United States Patent [19]

Parsons

[11] E Re. 29,533

[45] Reissued Feb. 7, 1978

[54] SELF-CENTERING JAW CHUCK

[75] Inventor: Hubert J. Parsons, Belleair Beach, Fla.

[73] Assignee: Hardinge Brothers, Inc., Elmira, N.Y.

[21] Appl. No.: 558,298

[22] Filed: Mar. 14, 1975

Related U.S. Patent Documents

Reissue of:

[64] Patent No.: 3,834,720
Issued: Sept. 10, 1974
Appl. No.: 330,437
Filed: Feb. 7, 1973

[51] Int. Cl.[2] ..... B23B 31/10

[52] U.S. Cl. ..... 279/1 L; 279/110; 279/121; 279/123

[58] Field of Search ..... 279/1 L, 110, 121, 123, 279/46, 23, 2

[56] References Cited

U.S. PATENT DOCUMENTS

| | | | |
|---|---|---|---|
| 1,937,644 | 12/1933 | Eaton | 279/2 |
| 3,006,654 | 10/1961 | Benjamin | 279/23 |
| 3,244,429 | 4/1966 | Walker et al. | 279/110 |
| 3,685,844 | 8/1972 | Sykes | 279/110 X |

*Primary Examiner*—Francis S. Husar
*Assistant Examiner*—William R. Briggs
*Attorney, Agent, or Firm*—Shlesinger, Arkwright, Garvey & Dinsmore

[57] ABSTRACT

A self-centering, radially reciprocating jaw chuck for machine tools and the like comprising a chuck body member, a plurality of master jaws secured to the body member, each of the master jaws having a pair of circumferentially spaced fixed portions rigidly secured to the body member and a radially reciprocable portion positioned circumferentially between the fixed portions. Resilient means integral with both the fixed portions and the radially reciprocable portion connect these portions, and a work gripping member is secured to each of the radially reciprocating portions. Axially reciprocable means is provided within the body member for radially reciprocating the radially reciprocable portions, and work gripping members attached thereto, whereby flexure of the resilient means provides a self-centering action of the work gripping members with respect to the longitudinal axis of the chuck and the work.

14 Claims, 7 Drawing Figures

Fig. 1
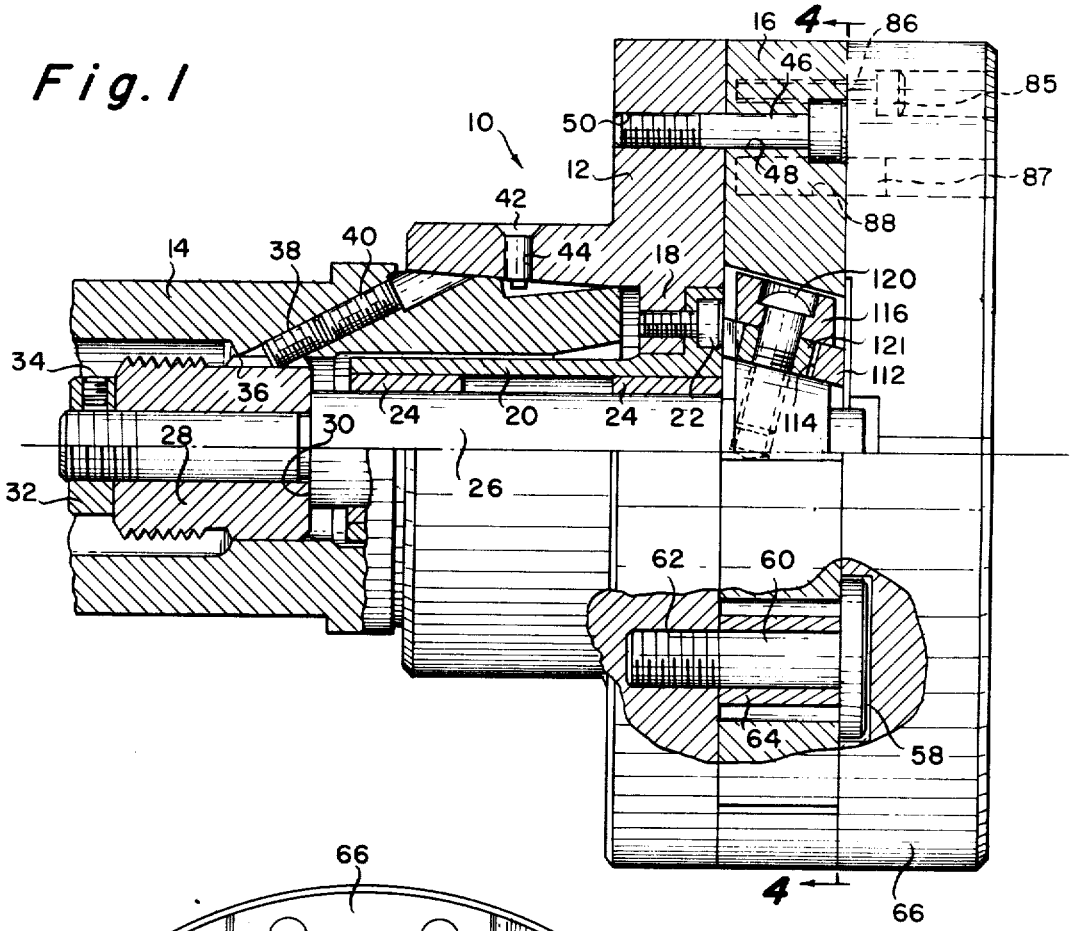
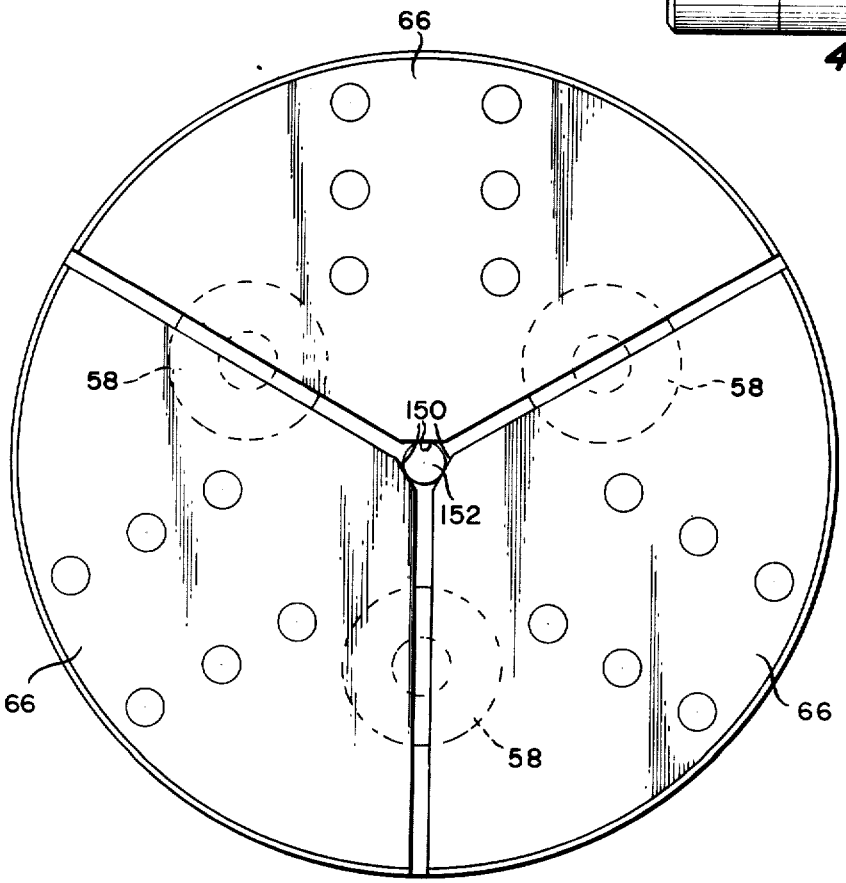
Fig. 2

Fig. 11
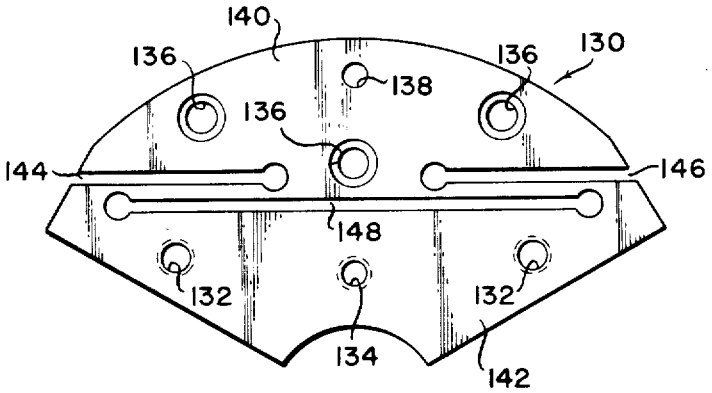
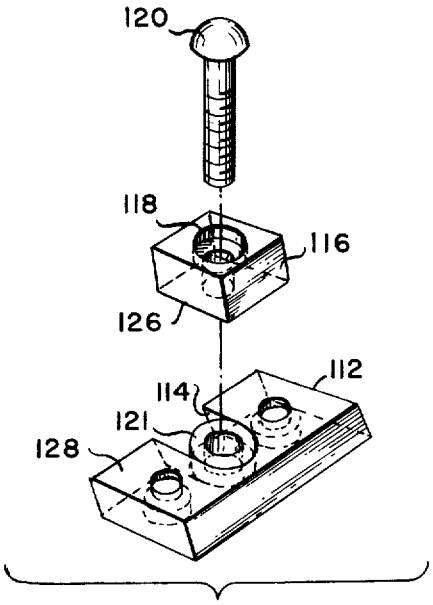
Fig. 10

SELF-CENTERING JAW CHUCK

Matter enclosed in heavy brackets [ ] appears in the original patent but forms no part of this reissue specification; matter printed in italics indicates the additions made by reissue.

BACKGROUND AND OBJECTS

This invention relates to a radially reciprocating jaw chuck for use on machine tools such as lathes and the like. More specifically, this invention relates to a jaw chuck for machine tools wherein the jaws are self-centering and thereby center the workpiece on the spindle axis.

The prior art is replete with many different constructions for reciprocating jaw chucks, and improvements thereto. One of the more common and least expensive constructions is of the type wherein radial stop screws adjust the radial position of the jaws and clamp the jaws onto the workpiece either internally or externally thereof. Each of the screws is adjusted independently and this type of construction while good for holding the workpiece, can result in inaccuracies in centering the workpiece on the lathe spindle axis.

Another type of jaw chuck is shown in my U.S. Pat. No. 3,658,353 which utilizes master jaws to which work gripping jaws are attached. An axially slideable cam member engages each of the master jaws resulting in simultaneous actuation of each of the work gripping jaws. In such a case, the draw plug actuator is double acting so as to both open and close the jaws of the chuck in a positive manner.

Another prior art type of jaw chuck is shown in U.S. Pat. No. 3,685,844 which utilizes a hydraulically actuated toggle mechanism for opening the jaws, and uses a built in type resilience in master jaws to close the work holding jaws. This type of arrangement however is typically suited only for internal or external gripping, and not both.

All of these prior art types of jaw chucks have advantages and disadvantages in use, but one disadvantage common to all lies in the ability of the chuck to center the workpiece on the center line of the spindle. In the case of a cylindrical workpiece, it is important that the axis of the workpiece in the chuck and the axis of the spindle be colinear. Any deviation from colinearity results in whip in the workpiece with increased wear on the cutting tool and decreased accuracy in the finished product. Additionally, lack of colinearity of the axis of the work and the spindle will result in off-center boring or elliptical turning or other deviations from the desired normal in the machining operation. Accordingly, it is imperative that the workpiece be centered on the spindle axis, and any improvement in the chuck which will facilitate the centering greatly reduces the time and skill required by the operator. Thus, machining costs can be held down by a self-centering type of jaw chuck.

Accordingly, a primary object of this invention is to provide a jaw chuck of the self-centering type.

Another object of this invention is to provide a self-centering jaw chuck of durable yet inexpensive construction.

A further object of this invention is to provide a self-centering jaw chuck which utilizes independent master jaws.

Still another object of this invention is to provide a jaw chuck of extremely high accuracy.

Still a further object of this invention is to provide a jaw chuck with relatively few moving parts.

Still another object of this invention is to provide a self-centering jaw chuck capable of high accuracy when used by an operator possessing lesser skill.

Yet a further object of this invention is to provide a self-centering jaw chuck which utilizes a plurality of master jaws having a fixed portion and a radially reciprocable portion resiliently secured thereto and to which work gripping jaws are attached.

These and other objects and advantages of this invention will become apparent when considered in light of the following description and claims taken together with the drawings, in which:

FIG. 1 is a side elevational view in partial section of a chuck according to this invention;

FIG. 2 is a right side elevation view of the chuck of FIG. 1;

FIG. 10 is an exploded view of a portion of the actuator, and

FIG. 11 is a plan view of an alternate embodiment of the master jaws.

DESCRIPTION OF THE INVENTION

Figure 4:
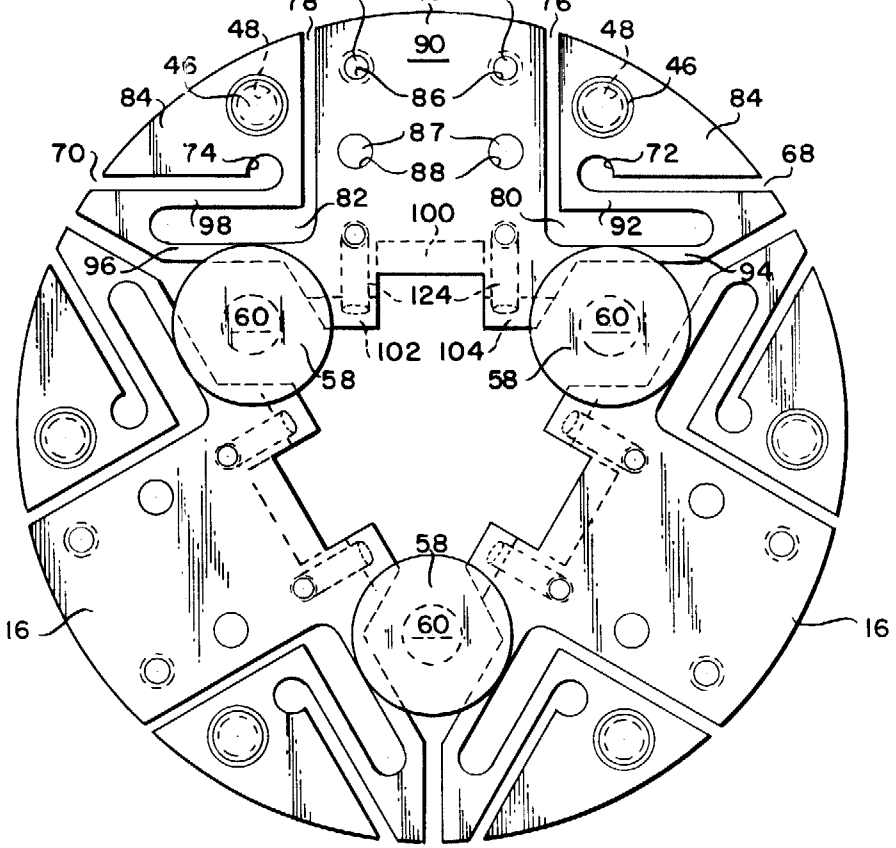
FIG. 4 is a sectional view along line 4—4 of FIG. 1 and viewed in the direction of the arrows.
Figure 3:
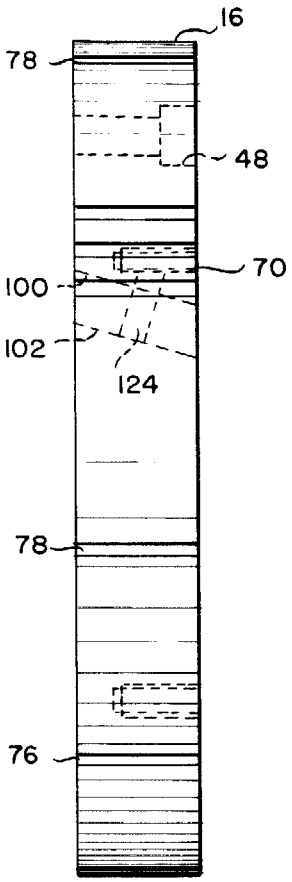
FIG. 3 is a side elevational view of the master jaws of the chuck of this invention.

Referring now to FIG. 1 of the drawings, the chuck generally designated 10 is seen to comprise a body member 12 mounted on a spindle 14. A plurality of master jaws 16 are attached to the body member 12.

Body member 12 is seen to include an inner flange 18 to which is bolted a guide bushing 20 by means of bolts 22. The inside of the guide bushing 20 is provided with a pair of bearings 24. The bearings 24 mount a draw plug 26 therein to permit axial movement of the draw plug. A draw collar 28 is positioned around the draw plug 26 and abuts against shoulder 30 of draw plug 26 and is secured in place by means of nut 32 which in turn is locked in place by means of set screw 34. Draw collar 28 is provided with a keyway 36, and key screw 38 engages keyway 36 to prevent relative rotation of the draw collar 28 and the spindle 14. A lock screw 40 maintains key screw 38 in position.

A screw 42 is provided in bore 44 to lock the chuck body member 12 to the spindle 14.

Secured to the front face of the chuck body member 12, are a plurality of master jaws 16 as seen in FIGS. 1, 3, 4, 7 and 8. Master jaws 16 are secured to the body member 12 by means of bolts 46 passing into bores 48 in the master jaw 16 and body member 12, and into threaded bores 50 in the body member 12. These screws fit tightly into bores 48 and act as dowels to eliminate any movement between jaws 16 and body member 12.

As best seen in FIG. 1, a cap screw 58 is provided with a shank portion 60 and a threaded portion 62. The threaded portion 62 threadedly engages the body member 12. A bushing 64 surrounds the shank portion 60 of the screw 58. Bushings 64 are ground simultaneously with the surfaces of the master jaws 16 and subsequently, the bushings 64 are removed while grinding is continued on the surfaces of the master jaws 16. The result is that master jaws 16 have a thickness slightly less than the length of the bushings 64. This difference is preferably on the order of 0.0005 inches. Thus, when the cap screw 58 is tightened, it bears against the bushing 64 and not against the master jaws 16. This provides a slight operating clearance between the master jaws 16, and the head portion of the screw 58.

Figure 7:
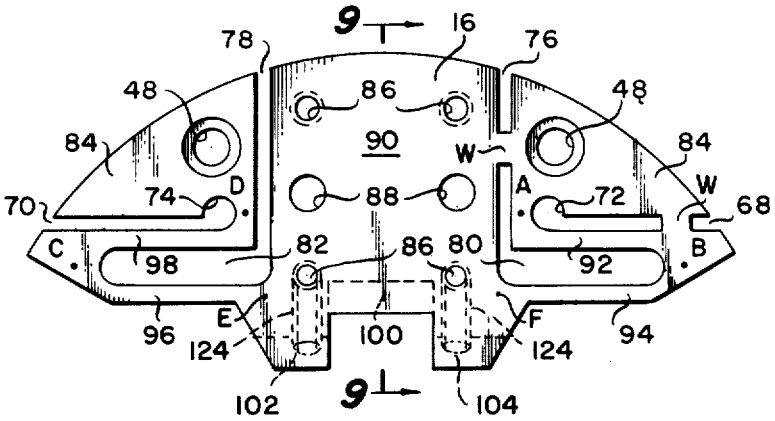
FIG. 7 is a front elevational view of one of the master jaws of this invention in its normal state.

The master jaws are shown in position on the body member 12 in FIG. 4 and FIG. 7 shows one of the jaws in its normal relaxed state. With reference to FIG. 7, each of the master jaws 16 is formed preferably by investment casting of a suitable alloy such as steel which will be spring tempered. Slots 68 and 70 terminate in circular bores 72 and 74 which serve to relieve stress at the inner ends of the slots. Slots 76 and 78 are preferably substantially perpendicular to slots 68 and 70, and terminate in oval openings 80 and 82 the major axes of which are substantially parallel to slots 68 and 70. Webs w are formed in the slots 68, 70, 76 and 78 during the casting process. After the master jaws are surface ground as discussed supra, the webs w are sawed or machined out thus opening the slots and permitting the necessary flexing. FIG. 7 shows one of the webs w before it is cut out.

As previously discussed, the master jaws 16 are secured to the chuck body member 12 by means of bolts 46 passing through bores 48. By virtue of this means of attachment, and the slot configuration as shown and described, the portions 84 of the master jaws 16 are fixed securely to the chuck body member 12. The work gripping jaws 66 are bolted to the master jaws by means of bolts 85 passing through the jaws 66 into threaded holes 86 and by means of dowel pins 87 passing from the work gripping jaw 66 into bores 88 in the master jaw 16. The slot configuration as described permits a flexure and resultant radial reciprocating motion of the radially reciprocable portion 90 of the master jaws 16, carrying therewith the work gripping jaws 66. This is provided by means of a pivotal action at points A, B, C, D, E and F at the termini of the respective leaf-spring-like members 92, 94, 96, and 98 which are formed by the cutout portions 68, 70, 80 and 82. Because each of the master jaws 16 is symmetrical with respect to the section line 9—9 which is also a radius of the chuck body member, an equal flexure on each of the work gripping jaws 66 is obtained. This symmetrical flexure force is the action which provides the self-centering aspect of this chuck construction. Additionally, the symmetry afforded by this construction eliminates any force imbalance on the rotating mass which would otherwise be encountered, thus further enhancing the accuracy capabilities of this construction.

Figure 5:
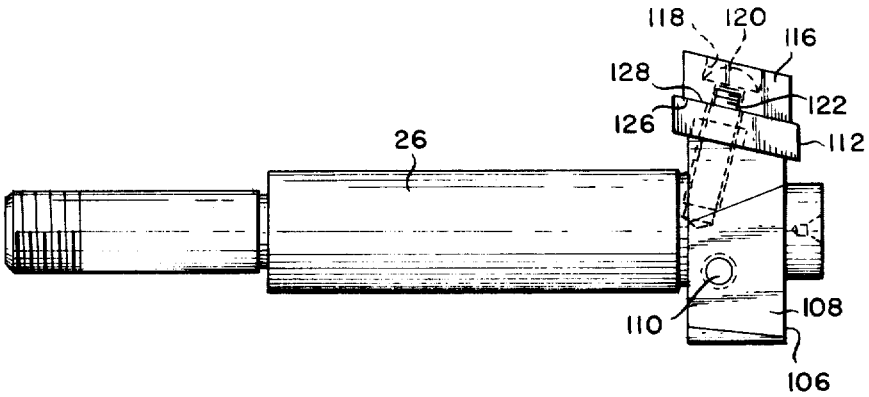
FIG. 5 is a side elevational view of the draw plug actuator of this invention.
Figure 6:
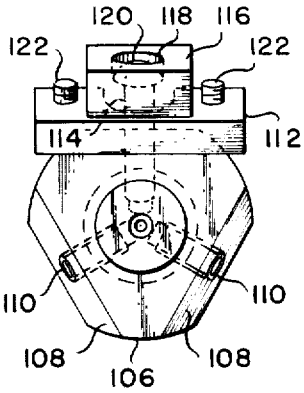
FIG. 6 is a right side elevational view of the actuator of FIG. 5.
Figure 9:
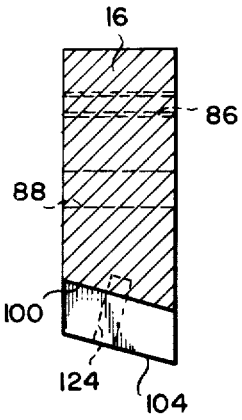
FIG. 9 is a sectional view along line 9—9 of FIG. 7 and viewed in the direction of the arrows.
Figure 8:
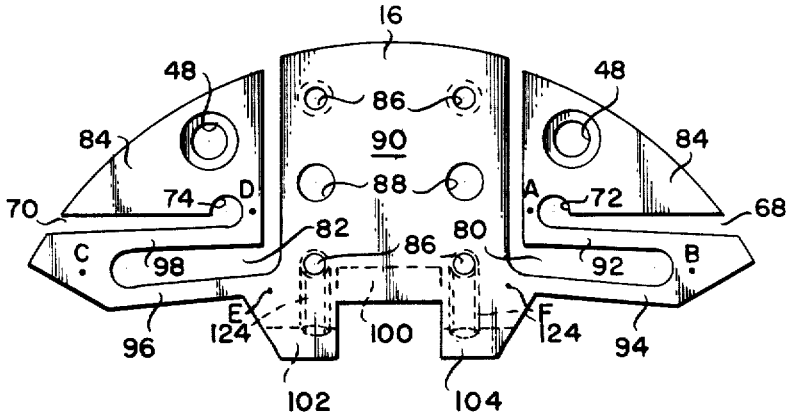
FIG. 8 is a view similar to FIG. 7 showing the master jaw in its expanded state.

With reference to FIGS. 7 and 9, each of the master jaws 16 is provided with cam surfaces 100, 102 and 104. These surfaces cooperate with the draw plug 26 in a manner hereinafter described to effect actuation and radial reciprocation of the radially reciprocable portion 90 of the master jaws 16, as well as the attached work gripping jaws 66. The draw plug 26 includes a head portion 106 having the configuration as shown in FIGS. 5 and 6, and is provided with tapered, flat surfaces 108 having threaded bores 110. A cam plate 112 rests on the flat surfaces 108, and the cam plate 112 is provided with a U-shaped cutout 114. A cam head 116 rests upon cam plate 114 and has a counterbored hole 118 passing therethrough. A bolt 120 passes through the hole 118, the U-shaped cutout 114 and threadedly engages the bores 110. A bushing 121 is positioned around the bolt 120 within the cutout portion 114 so as to permit relative sliding movement of the cam plate 112 with respect to the surface 108 and cam head 116. The cam plate 112 is bolted to surfaces 102 and 104 of the master jaws 16 by means of bolts 122 which threadedly engage bores 124 in the master jaws 16. Prior to their installation on the chuck during their manufacture, bushings 121 and cam plates 112 are surface ground together on a surface grinder to provide smooth surfaces and equal thicknesses of all of these parts. Then the bushings are removed while the grinding of the cam plates continues so as to reduce the thickness of the cam plates to about 0.0005 inches less than that of the bushings 121. This provides a slight operating clearance between cam plate 112 and cam head 116 and permits relative sliding of these parts without binding.

This technique of grinding bushings 121 and cam plates 112, as well as bushing 64 and master jaws 16, to provide slight clearances would at first seem to reduce the accuracy of such a chuck since a slight amount of free play is introduced. However the amount of play can be very precisely controlled and interchangeability of large numbers of parts assured at extremely low cost when compared with the usual hand fitting of chuck parts. Repeatability in accurately positioning a workpiece is tremendously improved with this method with very low manufacturing cost. Tests have shown this to be true by repeatedly positioning a given workpiece to within 50 millionths of an inch. Thus this chuck has extremely high, repeatable accuracy.

To further augment the accuracy capabilities of the chuck, flat surfaces 150 are accurately ground on the jaws 66, and a pin 152 is inserted therein and the chuck then is tightened to grip the pin 152. Next, the jaws 66 are turned while on the lathe to a size to fit the work being held. Thus, accurate gripping surfaces on the jaws 66 may be machined.

OPERATION

In operation, when it is desired to move the work gripping jaws 66 radially inwardly to grip a workpiece, the draw plug 26 is moved to the left as seen in FIG. 1, carrying with it the cam head 116. The surface 126 of cam head 116 bears against surface 128 of cam plate 112 which is in turn secured to the master jaw 16. Because of the relative sliding motion of members 112 and 116 along surfaces 128 and 126 respectively, the radially reciprocable portion 90 of master jaws 16 are caused to move radially inwardly as draw plug 26 is moved to the left as seen in FIG. 1, and moved radially outwardly as the draw plug 26 is moved to the right as seen in FIG. 1. During this radial reciprocation of the portions 90, the fixed portions 84 of the master jaws remains stationary. The flexure of the leaf spring members, 92, 94, 96 and 98 thusly provides a self-centering action of the work gripping jaws 66 on the workpiece.

In this manner, both a positive gripping and releasing force is obtained in operation of the chuck, thus securely gripping the workpiece during a machining operation whether the workpiece is gripped internally or externally. The screw 58 with the bushing 64 provide the necessary clearance between the head of screw 58 and body member 12 to allow portion 90 of jaws 16 to move freely while preventing its lower portion from moving outwardly away from body member 12.

Thus the chuck of this invention provides for highly accurate machining of workpieces held therein, and the self-centering action of the chuck permits ready and facile insertion of the workpiece into the chuck on the spindle centerline.

With reference to FIG. 11 an alternate embodiment of the master jaws is shown. Here, work gripping jaws (not shown) are secured to the master jaws 130 by means of screws passing into threaded bores 132 and a dowel pin passing into bore 134 and the master jaw 130 is secured to the chuck body by bolts passing through threaded bores 136 and a dowel pin passing through bore 138. In this construction, portion 140 is fixed while portion 142, carrying the work gripping jaws flexes by means of slots 144, 146 and 148 to permit self-centering of the work gripping jaws similarly to the previously described embodiment.

While this invention has been described, it will be understood that it is capable of further modification, and this application is intended to cover any variations, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What is claimed is:

1. A radially reciprocating jaw chuck for machine tools and the like comprising:

a. a chuck body member, b. a plurality of master jaws, c. each of said master jaws *being symmetrical about a radial line passing through the center thereof and* further having a [pair of circumferentially spaced] fixed [portions] *portion* rigidly secured to said body member and a radially reciprocable portion [positioned circumferentially between said fixed portions], d. *a pair of leaf members* resilient [means] integral with and connecting said fixed [portions] *portion* and said radially reciprocable portion *and chordally disposed with respect to said body member,* e. work gripping members secured to each of said radially reciprocable portions, f. cam means axially reciprocable in said body member [for] *operable to* radially [reciprocating] *reciprocate* said radially reciprocable portions and associated work gripping members between work gripping and release positions, g. whereby the flexure of said resilient [means provides] *leaf members provide* a self-centering action of said work gripping members with respect to the longitudinal axes of the chuck and the work.

[2. A jaw chuck as in claim 1 and wherein:

a. each of said master jaws is symmetrical about a radial line passing through the center thereof.]

[3. A jaw chuck as in claim 2 and wherein:

a. said integral resilient means comprises leaf means.]

[4. A jaw chuck as in claim 3 and wherein:

a. said leaf means comprises a pair of leaf members associated with each of said master jaws.]

5. A jaw chuck as in claim [4] *1* and wherein:

a. each of said leaf members of each pair is substantially U-shaped with each leg of each leaf member of each pair being parallel to the other legs of said pair.

6. A jaw chuck as in claim 5 and wherein:

a. said body member is circular, and b. each leg of each leaf member of each pair is chordally disposed with respect to said body member.

7. A jaw chuck as in claim [2] *1* and wherein:

a. said axially reciprocable cam means comprises a draw plug axially reciprocable in said body member, b. a cam plate member secured to each of said master jaws on an inner surface thereof, c. a recess in each of said master jaws adjacent said cam plate member, d. an elongate slot in each of said cam plate members, e. a cam head in each of said recesses between said cam plate member and said master jaw, f. bolt means passing through said slot for securing said cam head to said draw plug, g. whereby upon reciprocation of said draw plug, said cam head acts on said cam plate to radially reciprocate said cam plate and said master jaw.

8. A jaw chuck as in claim 7 and including:

a. a bushing around said bolt means and positioned in said slot.

9. A jaw chuck as in claim [2] *1* and including:

a. spacer means having a thickness slightly greater than the thickness of said master jaws for maintaining an operating clearance between said work gripping members and said fixed portions and between said radially reciprocable portion and said body member.

10. A jaw chuck as in claim 9 and wherein:

a. said spacer means comprises a plurality of bolts positioned in spaces between said master jaws, b. each of said bolts having an enlarged head portion, a shank portion, and a thread portion, c. a bushing member having a thickness slightly greater than the thickness of said master jaws and positioned around said shank portion, d. said thread portion threadedly engaging said body member, and e. recesses formed in said work gripping members to provide working clearance around said head portion.

11. A jaw chuck as in claim 6 and wherein:

a. said leaf members, said fixed portions and said radially reciprocable portions are all defined by slots provided in said master jaws.

12. A jaw chuck as in claim 11 and including:

a. three of said master jaws.

13. A master jaw for use in a reciprocating jaw chuck comprising:

a. an element having a configuration generally of a truncated sector, b. said element being symmetrical, c. a first pair of slots of substantially equal length extending chordally inwardly from [said arc] *the outer periphery of said truncated sector,* d. a second pair of slots of substantially equal length extending into said element substantially perpendicularly to said first slots and having terminal portions extending outwardly substantially parallel to said first slots, e. said slots dividing said element into two spaced portions attachable to a chuck body and an intermediate portion movable with respect to said spaced portions for supporting a work gripping jaw.

14. A master jaw as in claim 13 and wherein:

a. said truncated sector is formed by two radii, an included arc, and a chord intersecting said radii.

15. A master jaw as in claim 14 and wherein:

a. said element is symmetrical with respect to a radial line bisecting the angle between said two radii.

16. A master jaw as in claim 15 and wherein:

a. said first pair of slots are substantially parallel to said chord.

17. A master jaw as in claim 16 and wherein:

a. said second pair of slots are substantially parallel to said radial line of symmetry.

* * * * *